(12) United States Patent
Luo et al.

(10) Patent No.: US 12,242,961 B2
(45) Date of Patent: Mar. 4, 2025

(54) TRAINING METHOD AND SYSTEM OF NEURAL NETWORK MODEL AND PREDICTION METHOD AND SYSTEM

(71) Applicant: THE FOURTH PARADIGM (BEIJING) TECH CO LTD, Beijing (CN)

(72) Inventors: Yuanfei Luo, Beijing (CN); Weiwei Tu, Beijing (CN); Rui Cao, Beijing (CN); Yuqiang Chen, Beijing (CN)

(73) Assignee: THE FOURTH PARADIGM (BEIJING) TECH CO LTD, Beijing (CN)

(*) Notice: Subject to any disclaimer, the term of this patent is extended or adjusted under 35 U.S.C. 154(b) by 1003 days.

(21) Appl. No.: 17/262,974

(22) PCT Filed: Jul. 22, 2019

(86) PCT No.: PCT/CN2019/096971
§ 371 (c)(1),
(2) Date: Jan. 25, 2021

(87) PCT Pub. No.: WO2020/020088
PCT Pub. Date: Jan. 30, 2020

(65) Prior Publication Data
US 2021/0264272 A1 Aug. 26, 2021

(30) Foreign Application Priority Data

Jul. 23, 2018 (CN) .......................... 201810813359.9
Jul. 10, 2019 (CN) .......................... 201910618144.6

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC .......... G06N 20/20; G06N 3/04; G06N 3/045; G06N 3/08; G06N 3/082
See application file for complete search history.

(56) References Cited

U.S. PATENT DOCUMENTS

2018/0068216 A1 3/2018 Sheng et al.

FOREIGN PATENT DOCUMENTS

| CN | 105787500 A | 7/2016 |
|----|-------------|--------|
| CN | 107220707 A | 9/2017 |
| CN | 107480774 A | 12/2017 |

OTHER PUBLICATIONS

Brebisson, et al., "Artificial Neural Networks Applied to Taxi Destination Prediction," 2015, arXiv:1508.00021 (Year: 2015).*

(Continued)

*Primary Examiner* — Michael J Huntley
*Assistant Examiner* — Vincent Anton Spraul
(74) *Attorney, Agent, or Firm* — Bridgeway IP Law Group, PLLC; Sang Ho Lee; Hyun Woo Shin

(57) ABSTRACT

A training method and system of a neural network model including a three-level model, and a prediction method and system are provided. The training method includes: acquiring a training data record; generating features of a training sample based on attribute information of the training data record, and using a label of the training data record as a label of the training sample; training the neural network model using a set of the training samples, learning an interaction representation between corresponding input items respectively by a plurality of intermediate models comprised in a second-level model of the neural network model, learning a prediction result at least based on the interaction representations output by the second-level model by a third-level (Continued)

model of the neural network model, and adjusting the neural network model at least based on a difference between the prediction result and the label.

16 Claims, 7 Drawing Sheets

(56) References Cited

OTHER PUBLICATIONS

Koehrseon, "Automated Feature Engineering Basics," www.kaggle.com/code/willkoehrsen/automated-feature-engineering-basics, Jun. 16, 2018 (Year: 2018).*

Thornton, et al., "Auto-WEKA: Combined Selection and Hyperparameter Optimization of Classification Algorithms," 2012, arXiv:1208.3719 (Year: 2012).*

Bentaieb, et al., "Uncertainty Driven Multi-Loss Fully Convolutional Networks for Histopathology," 2017, doi.org/10.1007/978-3-319-67534-3_17 (Year: 2017).*

He, et al., "Deep Residual Learning for Image Recognition," 2015, arXiv:1512.03385 (Year: 2015).*

Brandmaier, "Permutation Distribution Clustering and Structural Equation Model Trees," Thesis, 2012 (Year: 2012).*

Mavrovouniotis, "Hierarchical Neural Networks," Computers and Chemical Engineering, 1992, vol. 16 (Year: 1992).*

TensorFlow Team, "Introducing TensorFlow Feature Columns," posted Nov. 20, 2017, developers.googleblog.com/2017/11/introducing-tensorflow-feature-columns.html (Year: 2017).*

Liu, et al., "Learn to Combine Modalities in Multimodal Deep Learning," May 29, 2018, arXiv:1805.11730 (Year: 2018).*

Raiko et al., "Deep Learning Made Easier by Linear Transformations in Perceptrons," 2012, Proceedings of the 15th International Conference on Artificial Intelligence and Statistics (Year: 2012).*

Maptools.com, https://www.maptools.com/tutorials/lat_lon/formats, retrieved from version posted Feb. 10, 2019 (Year: 2019).*

* cited by examiner

TRAINING METHOD AND SYSTEM OF NEURAL NETWORK MODEL AND PREDICTION METHOD AND SYSTEM

TECHNICAL FIELD

The application claims priority of two Chinese patent applications: (1) the Chinese patent application with the application number 201810813359.9, the application date Jul. 23, 2018, and the title "Training Method and System of Neural Network Model and Prediction Method and System"; (2) the Chinese patent application with the application number 201910618144.6, the application date Jul. 10, 2019, and the title "Training Method and System of Neural Network Model and Prediction Method and System".

The application relates to deep learning, and more specifically, to a training method and system of a neural network model including a three-level network model and a prediction method and system.

BACKGROUND

With the occurrence of massive data, artificial intelligence technology has been developed rapidly. Machine learning (including deep learning) is an inevitable product of the development of artificial intelligence to a certain stage. It is committed to mining valuable potential information from a large amount of data through computational means.

For example, in a neural network model commonly used in a field of the deep learning, the neural network model is usually trained by providing training data records to the neural network model to determine ideal parameters of the neural network model, and the trained neural network model may be applied to provide a corresponding prediction result when facing with a new prediction data record.

At present, the deep learning has made breakthroughs in many fields, such as computer vision and speech recognition. However, how to apply the deep learning to large-scale discrete feature data common in the industry remains to be explored. The industry and the academia have proposed more than ten models based on Deep Neural Network (DNN), such as Wide & Deep of Google, Deep Crossing of Microsoft, DIN of Alibaba, etc. Compared to traditional deep learning algorithms, the above models have achieved good results. However, the model structures corresponding to the above algorithms all depend on their own business and type of data, and thus the versatility is not enough.

SUMMARY

According to an exemplary embodiment of the application, a training method of a neural network model comprising a three-level model is provided. The method comprises: acquiring a training data record; generating features of a training sample based on attribute information of the training data record, and using a label of the training data record as a label of the training sample; and training the neural network model using a set of the training samples, wherein, in training the neural network model, learning a feature information representation of each feature itself respectively by a plurality of under-layer neural network models comprised in a first-level model of the neural network model, learning an interaction representation between corresponding input items respectively by a plurality of intermediate models comprised in a second-level model of the neural network model, wherein the corresponding input items comprise at least one of the feature information representations output by the first-level model, learning a prediction result at least based on the interaction representations output by the second-level model by a top-layer neural network model as a third-level model of the neural network model, and adjusting the neural network model comprising the three-level model at least based on a difference between the prediction result and the label.

According to another exemplary embodiment of the application, a training system of a neural network model comprising a three-level model is provided. The system comprises: a data acquisition device configured to acquire a training data record; a sample generation device configured to generate features of a training sample based on attribute information of the training data record, and use a label of the training data record as a label of the training sample; and a training device configured to train the neural network model using a set of the training samples, wherein, in training the neural network model, the training device learns a feature information representation of each feature itself respectively by a plurality of under-layer neural network models comprised in a first-level model of the neural network model, learns an interaction representation between corresponding input items respectively by a plurality of intermediate models comprised in a second-level model of the neural network model, learns a prediction result at least based on the interactive representations output by the second-level model by a top-layer neural network model as a third-level model of the neural network model, and adjusts the neural network model comprising the three-level model at least based on a difference between the prediction result and the label, wherein the corresponding input items comprise at least one of the feature information representations output by the first-level model.

According to another exemplary embodiment of the application, a computer-readable medium, on which a computer program for performing the aforementioned training method of the neural network model comprising the three-level model by one or more computing devices is recorded, is provided.

According to another exemplary embodiment of the application, a system comprising one or more computing devices and one or more storage devices is provided, wherein instructions are recorded on the one or more storage devices, and wherein the instructions, when executed by the one or more computing devices, cause the one or more computing devices to implement the aforementioned training method of the neural network model comprising the three-level model.

According to another exemplary embodiment of the application, a method of performing a prediction using a neural network model is provided. The method comprises: acquiring a prediction data record; generating features of a prediction sample based on attribute information of the prediction data record; and providing a corresponding prediction result for the prediction sample using the neural network model trained by the foregoing training method of the neural network model comprising the three-level model.

According to another exemplary embodiment of the application, a prediction system of performing a prediction using a neural network model is provided. The prediction system comprises: a data acquisition device configured to acquire a prediction data record; a sample generation device configured to generate features of a prediction sample based on attribute information of the prediction data record, and a prediction device configured to provide a corresponding prediction result for the prediction sample using the neural network model trained by the foregoing training method of the neural network model comprising the three-level model.

According to another exemplary embodiment of the application, a computer-readable medium, on which a computer program for performing the aforementioned method of performing a prediction using the neural network model by one or more computing devices is recorded, is provided.

According to another exemplary embodiment of the application, a system comprising one or more computing devices and one or more storage devices is provided, wherein instructions are recorded on the one or more storage devices, and wherein the instructions, when executed by the one or more computing devices, cause the one or more computing devices to implement the aforementioned method of performing a prediction using the neural network model.

By applying the training method and system of the neural network model and the prediction method and system according to the exemplary embodiment of the disclosure, it is possible to more effectively extract information of the feature itself and information between the features, and then learn a prediction target based on these information, thereby improving prediction effect of the model.

Additional aspects and/or advantages of the general concept of the disclosure will be partially set forth in the following description, and some of them will be clear through the description, or may be learned through the implementation of the general concept of the disclosure.

BRIEF DESCRIPTION OF THE DRAWINGS

These and/or other aspects and advantages of the application will become more clearer and easier to understand from the following detailed description of the embodiments of the application, taken in conjunction with the accompanying drawings, in which.

Hereinafter, the disclosure will be described in detail in conjunction with the accompanying drawings. Throughout the accompanying drawings, the same or similar elements will be designated by the same or similar reference number.

DETAILED DESCRIPTION

Figure 1:
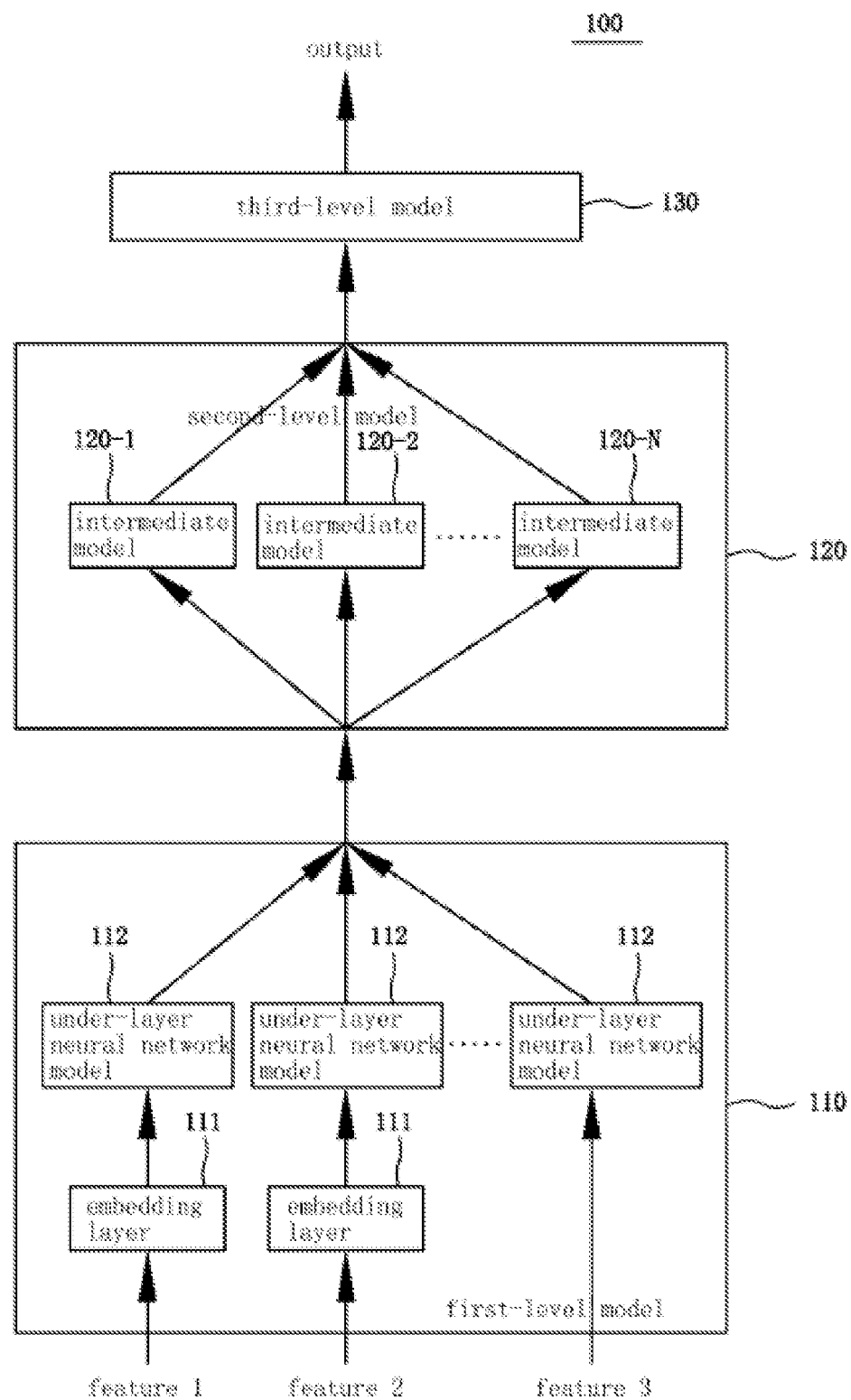
FIG. 1 is a diagram illustrating a neural network model including a three-level model according to an exemplary embodiment of the disclosure.

The following description taken with reference to the accompanying drawings is provided to help to have a comprehensive understanding of the exemplary embodiments of the disclosure defined by the claims and their equivalents. Various specific details are included in the description to help understanding, but these details are considered only exemplary. Therefore, those of ordinary skill in the art will recognize that various changes and modifications may be made to the embodiments described herein without departing from the scope and spirit of the disclosure. In addition, for clarity and conciseness, descriptions of known functions and configurations may be omitted. It should be explained here that "and/or" appearing in the disclosure denotes a situation involving at least one of the listed items. For example, "including A and/or B" denotes including at least one of A and B, that is, including the following three parallel situations: (1) including A; (2) including B; (3) including A and B. For another example, "performing step one and/or step two" denotes to performing at least one of the step one and the step two, which denotes the following three parallel situations: (1) performing the step one; (2) performing the step two; (3) performing the step one and the step two. For another example, "including A, B, and/or C" denotes including at least one of A, B, and C, which denotes the following seven situations: (1) including A; (2) including B; (3) including C; (4) including A and B; (5) including A and C; (6) including B and C; (7) including A, B and C.

With the occurrence of massive data, artificial intelligence technology has been developed rapidly. Machine learning (including deep learning) is an inevitable product of the development of the artificial intelligence to a certain stage. It is committed to improving the performance of the system itself using experience through computational means. In computer systems, "experience" usually exists in the form of "data". Through a machine learning algorithm, "a model" may be generated from the data. That is to say, the model may be generated based on experience data by providing these experience data to the machine learning algorithm, and when facing with a new situation, the model will provide a corresponding judgment, that is, a prediction result.

In order to dig out value from a large amount of data, relevant personnel are required not only to be proficient in the artificial intelligence technology (especially the machine learning technology), but also to be very familiar with specific scenarios (for example, image processing, voice processing, automatic control, financial business, internet advertising, etc.) of applying the machine learning technology. For example, if the relevant personnel do not have enough understanding on business or not have enough experience for modeling, it is easy to lead to a poor modeling result. At present, this phenomenon may be alleviated from two aspects. One aspect is to lower the threshold of the machine learning so that the machine learning algorithm is easy to use; another aspect is to improve the accuracy of the model, so that the algorithm is more versatile and can produce a better result. It should be understood that the two aspects are not opposites. For example, the improvement of an algorithm effect in the other aspect may help the one aspect. In addition, when expecting to make corresponding target prediction using the neural network model, the relevant personnel not only need to be familiar with various complex technical details about the neural network, but also need to understand the business logic behind the data involved in the predicted target, for example, if the relevant personnel want to use the machine learning model to identify criminal suspects, they must also understand which characteristics the criminal suspects may have; if the relevant personnel want to use the machine learning model to identify fraudulent transactions in financial industry, they must also understand trading habits and a series of corresponding expert rules, etc. of the financial industry. All of the above have brought great difficulties to the application prospect of the machine learning technology.

For this reason, technicians hope to solve the above-mentioned problems through the technical means, thereby reducing the threshold of model training and model application while effectively improving the effect of the neural network model. Many technical problems are involved in this process, for example, in order to obtain an effective model, not only the unsatisfactory of training data itself (for example, insufficiency of the training data, missing of the training data, sparseness of the training data, and distribution differences between the training data and prediction data, etc.) has to be faced, but also it needs to solve the problem of computing efficiency of massive data. That is to say, in reality, it is impossible to perform a machine learning process using a perfect set of training data by means of an infinitely complex ideal model. As a data processing system or method for the purpose of prediction, any plan for training the model or for predicting using the model must be subject to objectively existing data restrictions and computing resource restrictions, and the above technical problems are solved by using specific data processing mechanisms in a computer. These data processing mechanisms rely on processing capability the computer, processing methods and processing data, not purely mathematical or statistical calculations.

FIG. 1 is a diagram illustrating a neural network model 100 including a three-level model according to an exemplary embodiment of the disclosure.

Referring to FIG. 1, the neural network model 100 including the three-level model according to the exemplary embodiment of the disclosure may include a first-level model 110, a second-level model 120, and a third-level model 130.

As shown in FIG. 1, in the exemplary embodiment of the disclosure, the first level model 110 may include one or more under-layer neural network models 112, which are designed to learn a feature information representation of each feature itself; as an example, the first-level model 110 may further include one or more embedding layers 111 based on an embedding function, and each embedding layer 111 may be connected to a corresponding under-layer neural network model 112. The second-level model 120 may include a plurality of intermediate models 120-1 to 120-N, which are designed to learn an interaction representation between corresponding input items, wherein the corresponding input items may include at least one of the feature information representations output by the first-level model. The third-level model 130 may be a single neural network model, which is designed to learn a prediction result at least based on the interaction representations output by the second-level model.

The neural network model 100 including the three-level model in the embodiment of the disclosure may be used to predict image categories, text categories, voice emotions, fraudulent transactions, advertising click rates, and the like.

Furthermore, the scenarios in which the neural network model 100 including the three-level model in the embodiments of the disclosure may be used include, but are not limited to:

image processing scenarios, including: optical character recognition OCR, face recognition, object recognition and image classification; more specifically, for example, the OCR may be applied to bill (such as invoice) recognition, handwriting recognition, etc., the face recognition may be applied to the field of security, etc., the object recognition may be applied to traffic sign recognition in autonomous driving scenarios, and the image classification may be applied to "photo shopping", "find the same style", etc. on e-commerce platforms.

voice recognition scenarios, including: products that may perform human-computer interaction through voice, such as voice assistants of mobile phones (such as Siri of Apple), intelligent speakers, etc.;

natural language processing scenarios, including: reviewing text (such as contracts, legal documents, customer service records, etc.), spam content recognition (such as spam short message recognition), and text classification (emotions, intentions, topics, etc.);

automatic control scenarios, including: a prediction for adjustment operations of a mine group, a prediction for adjustment operations of a wind turbine group, and a prediction for adjustment operations of an air conditioning system; specifically, a group of adjustment operations with a high mining rate may be predicted for the mine group, and a group of adjustment operations with a high power generation efficiency may be predicted for the wind turbine group, a group of adjustment operations of saving energy consumption while meeting demand may be predicted for the air conditioning system;

intelligent question-and-answer scenarios, including: chat robots and intelligent customer services;

business decision-making scenarios include: scenarios in financial technology, medical and municipal fields, wherein:

the financial technology field includes: marketing (such as a prediction for coupon usage, a prediction for advertising click behavior, user portrait mining, etc.) and customer acquisition, anti-fraud, anti-money laundering, underwriting and credit scoring and a prediction for product price;

the medical field includes: disease screening and prevention, personalized health management and auxiliary diagnosis;

the municipal field includes: social governance and regulatory enforcement, resource environment and facility management, industrial development and economic analysis, public service and livelihood guarantee, smart cities (the deployment and management of various urban resources such as buses, ride-hailing cars, shared bicycles, etc.);

recommendation business scenarios, including: recommendations of news, advertising, music, consulting, video and financial products (such as financial management, insurance, etc.);

search scenarios, including: web search, image search, text search, video search, etc.;

abnormal behavior detection scenarios, including: detection of an abnormal behavior of electricity consumption by State Grid customers, detection of network malicious traffic, detection of an abnormal behavior in operation logs, etc.

It should be noted that, in the exemplary embodiment of the disclosure, the term "level" is different from the layers constituting neural network. One level, which may include a plurality of layers, may cover a set of a series of operations performed by a single neural network structure as a whole.

Hereinafter, a training process of the neural network model 100 including the three-level model will be explained in detail in conjunction with FIGS. 2 to 5.

Figure 2:
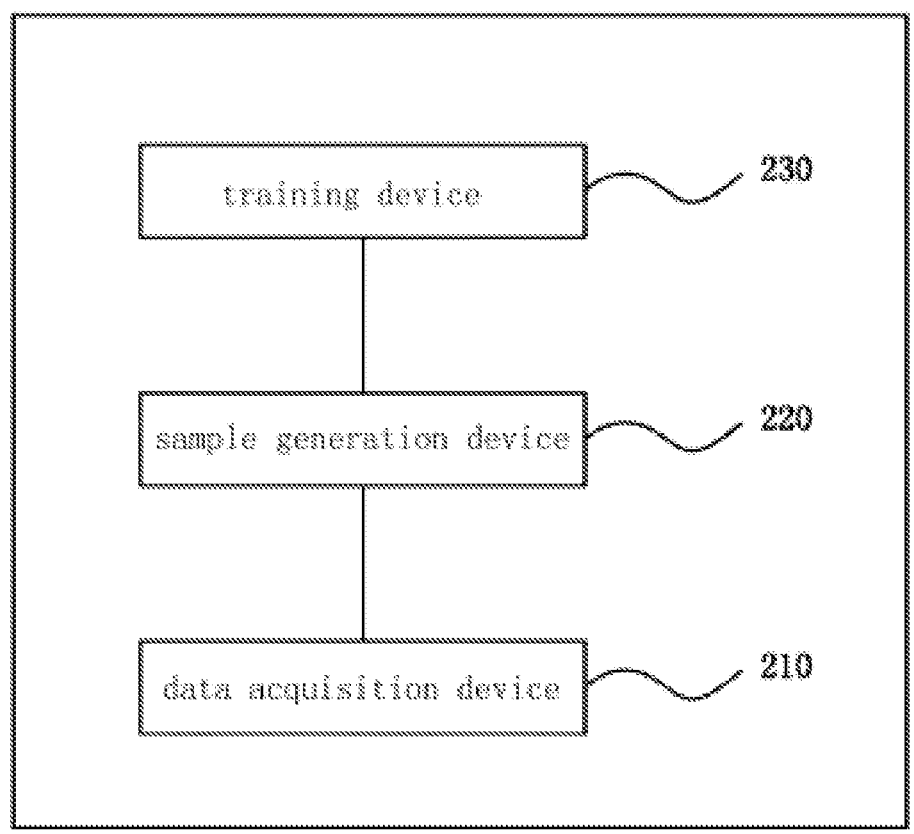
FIG. 2 illustrates a training system of the neural network model according to an exemplary embodiment of the disclosure.

FIG. 2 illustrates a training system 200 of the neural network model 100 including the three-level model according to an exemplary embodiment of the disclosure.

As shown in FIG. 2, the training system 200 may include a data acquisition device 210, a sample generation device 220 and a training device 230.

The data acquisition device 210 may be used to acquire a training data record.

In the embodiment of the disclosure, the acquired training data record varies according to different scenarios to which the neural network model 100 including the three-level model is applied. For example, in an OCR scenario of the image processing, the acquired data record is image data, and a label of the data record is the text in the image; while in the anti-money laundering and anti-fraud related scenarios in the financial technology field, the acquired training data is transaction flow data of a user of a bank and data related to the user itself, and the label of the acquired data record is the label about whether a specific transaction is money laundering or fraud. Those skilled in the art may understand the difference in training data in different scenarios.

That is, those skilled in the art may understand that when the neural network model 100 including the three-level model is applied to a specific scenario, the neural network model 100 including the three-level model is obtaining by training based on a set of the training sample data corresponding to the specific scenario. For example, for the prediction of the product price, the corresponding set of the training sample data is historical data of the product (for example, attributes of the product itself, a season, the amount of inventories, etc. when the product is sold in history are used as the features of the sample, and the price when the product is sold is used as the label). Correspondingly, in the scenario of the prediction for the product price, the prediction data is composed of the current relevant information of the product, and a prediction sample is constructed based on the prediction data. For example, the current attributes of the product, the season, and the amount of inventories are used as the features of the prediction sample, and a prediction price of output by the model is obtained after the prediction sample is input into the neural network model 100 including the three-level model. Other scenarios are similar, which will not be repeated here.

Here, the training data record may be data generated online, data generated and stored in advance, or data received from the outside through an input device or a transmission medium. These data may involve attribute information of individuals, enterprises, or organizations, such as information of identity, education, occupation, assets, contact information, liabilities, income, profit, taxation, or the like. Or, these data may also involve attribute information of business-related items, for example, information about transaction amount, parties to transaction, a subject matter, location of the transaction, etc. of a purchase and sale contract. It should be noted that the attribute information content mentioned in the exemplary embodiments of the disclosure may relate to performance or nature of any object or transaction in a certain aspect, and is not limited to define or describe individuals, objects, organizations, units, institutions, projects, events, etc.

As an example, structured or unstructured data (for example, text data or numerical data, etc.) from different sources may be acquired. These data may come from inside of an entity that expects to acquire the prediction result of the model, for example, from banks, companies, schools, etc., that expect to acquire the prediction result; these data may also come from outside of the above entity, for example, from data providers, internet (for example, social networking sites), mobile operators, APP operators, courier companies, credit agencies, etc. Alternatively, the aforementioned inside data and outside data may be used in combination to form the training data record that carries more information.

The above data may be input to the data acquisition device through an input device, or automatically generated by the data acquisition device based on the existing data, or may be obtained by the data acquisition device from network (for example, a storage medium on the network (for example, a data warehouse)). In addition, an intermediate data exchange device such as a server may help the data acquisition device acquire corresponding data from external data sources. Here, the acquired data may be converted into an easily processed format by a data conversion module such as a text analysis module in the data acquisition device. It should be noted that the data acquisition device may be configured as respective modules composed of software, hardware, and/or firmware, and some or all of these modules may be integrated or cooperated to complete a specific function.

The sample generation device 220 may generate features of a training sample based on attribute information of the training data record acquired by the data acquisition device 210, and use a label of the training data record as a label of the training sample. Then, the training device 230 may train the neural network model 100 based on the training samples generated by the sample generation device 220.

In the example embodiment of the disclosure, in training the neural network model, the training device 230 may learn a feature information representation of each feature itself respectively by a plurality of under-layer neural network models 112 included in a first-level model 110 of the neural network model 100, learn an interaction representation between corresponding input items (wherein the corresponding input items include at least one of the feature information representations learned by the under-layer neural network model 112) respectively by a plurality of intermediate models 120-1 to 120-N included in a second-level model 120 of the neural network model 100, and learn a prediction result at least based on the interaction representations output by the second-level model 120 by a top-layer neural network model as a third-level model 130 of the neural network model 100. Here, the training device 230 may adjust the neural network model 100 including the three-level model at least based on a difference between the prediction result and the label of the training sample.

The neural network model 100 including the three-level model is intended to make a prediction with respect to problems related to objects or events in related scenarios, for example, it may be used to predict an image category, text in an image, a text category, a voice emotion category, a fraudulent transaction, advertising click rate, a product price, etc., so that the prediction result may be used as a basis for decision-making directly or used as the basis for decision-making after being further combined with other rules.

Hereinafter, the method for training the neural network model 100 including the three-level model by the training system 200 will be described in detail with reference to FIG. 3.

Figure 3:
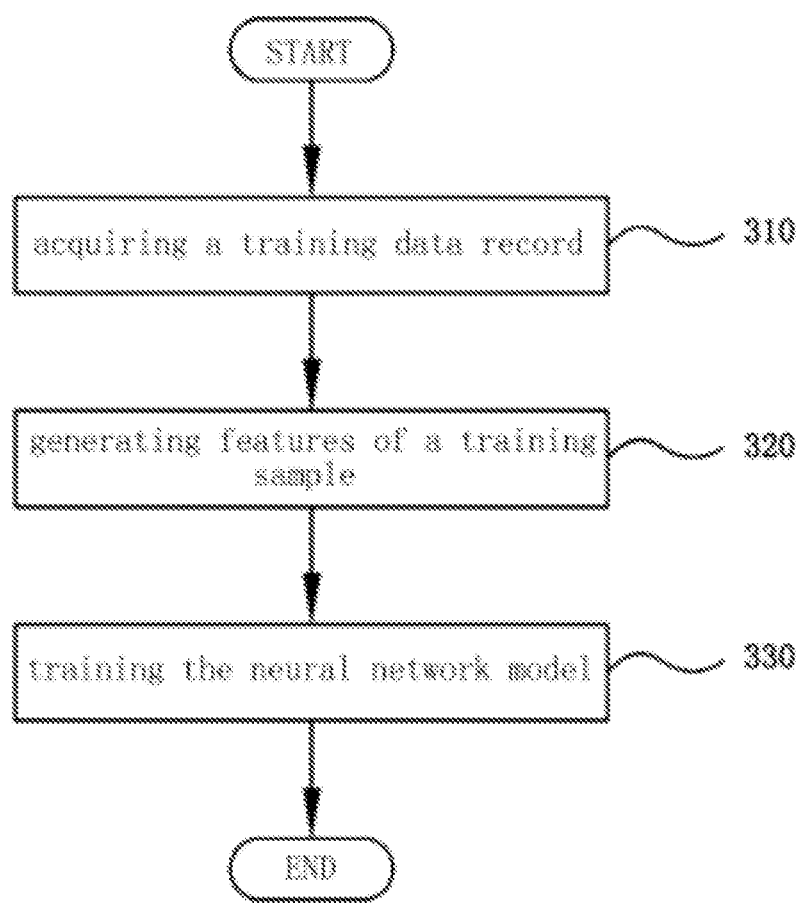
FIG. 3 is a flowchart illustrating a training method of the neural network model according to an exemplary embodiment of the disclosure.

FIG. 3 is a flowchart illustrating a training method of the neural network model 100 including the three-level model according to an exemplary embodiment of the disclosure.

Referring to FIG. 3, in step 310, the training data record may be acquired by the data acquisition device 210. In the exemplary embodiment of the disclosure, the training data record may be a set of historical data records used to train the neural network model 100, and the historical data records have a real result about a prediction target of the neural network model, that is, the label.

In step 320, the sample generation device 220 may generate features of a training sample based on attribute information of the training data record acquired in step 320, and use the label of the training data record as the label of the training sample. As an example, the sample generation device 220 may perform a corresponding feature engineering processing on the training data record. Here, the sample generation device 220 may either directly use a certain attribute field of the training data record as a corresponding feature, or obtain the corresponding feature by processing attribute fields (including the processing of the field itself or various operations between the fields, etc.). In terms of characteristics of feature values, the features of the training sample may be divided into a discrete feature (which has a group of discrete possible values, for example, residential cities, etc., for example, feature 1 and feature 2 shown in FIG. 1) and a continuous feature (in which, as opposed to the discrete feature, the range of possible values is not limited, for example, feature 3 shown in FIG. 1).

Then, in step 330, the neural network model 100 may be trained by the training device 230 based on the training samples.

Specifically, in step 330, the training device 230 may learn a feature information representation of each feature itself by the plurality of under-layer neural network models 112 included in the first-level model 110 of the neural network model 100. Here, the each feature of the training sample may be input into the corresponding under-layer neural network model 112 directly or after being transformed, and a corresponding feature information representation may be obtained at least based on the output of the under-layer neural network model 112.

In existing neural network models, the features are usually input directly (for example, input after passing through an embedding layer) to the neural network for learning. However, different features have different prediction capabilities for the target, so it is difficult to make full use of more important features, which has a certain impact on the accuracy of the prediction result. As described above, according to the exemplary embodiments of the disclosure, it will help to improve the overall prediction effect of the model by setting the under-layer neural network model to specifically learn the information representation of the respective corresponding feature.

As an example, the training device 230 may first make at least one feature of the training sample pass through the corresponding embedding layer 111, thereby obtaining at least one feature embedding vector corresponding to the at least one feature. In the exemplary embodiment of the disclosure, the at least one feature may be the discrete feature, or the at least one feature may be a discretized feature obtained after discretizing an input continuous feature. In other words, the training device 230 may make the discrete feature among the features of the training sample pass through the corresponding embedding layer 111 to obtain a corresponding feature embedding vector, and discretize at least one continuous feature among the features of the training sample, and then make the feature subject to a discretization process pass through the corresponding embedding layer 111 to obtain the corresponding feature embedding vector. In this case, the training device 230 makes the discrete feature among the features of the training sample and the continuous feature subjected to the discretization process pass through the corresponding embedding layer 111, and makes the feature embedding vectors output by each embedding layer 111 pass through the corresponding under-layer neural network model 112 respectively, and learns the feature information representation of the corresponding feature by the corresponding under-layer neural network model 112.

Or, as another example, the training device 230 may only make the discrete feature among the features of the training sample pass through the corresponding embedding layer 111 to obtain the corresponding feature embedding vector, but input the continuous feature among the features of the training sample as a one-dimensional feature embedding vector into the under-layer neural network model 112 without passing through the embedding layer 111. In this case, the training device 230 may make the discrete feature among the features of the training sample pass through the corresponding embedding layer 111 and make the feature embedding vectors output by the each embedding layer 111 pass through the corresponding under-layer neural network model 112, and learn the feature information representation of the corresponding discrete feature by the corresponding under-layer neural network model 112; and make the continuous feature among the features of the training sample directly pass through the corresponding under-layer neural network model 112, and learn the feature information representation of the corresponding continuous feature by the corresponding under-layer neural network model 112.

In the existing neural network model, a feature embedding dimension of the input model is usually manually specified, and the dimension of the embedding layer for the each feature is generally the same. However, since the model effect of the neural network model is highly correlated with the dimension of the embedding layer, using the same dimension of the embedding layer will increase usage cost of the model. In addition, since the amount of information contained in different features is not exactly the same, using the same dimension of the embedding layer for all features will make the dimension of output of some features after passing through the embedding layer too large and the dimension of output of some features after passing through the embedding layer too small.

In an exemplary embodiment of the disclosure, before the training device 230 makes the features of the training sample pass through the corresponding embedding layer 111, the training device 230 may determine the dimension of the each embedding layer 111 respectively, that is, the each embedding layer 111 does not have to have the same dimension. Thus, it is possible to adaptively determine the dimension of the embedding layer 111 for different features, so that the neural network model may be trained more effectively.

Alternatively, in the exemplary embodiment of the disclosure, the training device 230 may determine the dimension of the each embedding layer 111 respectively at least based on the feature input to the each embedding layer 111.

Just as an example, the training device 230 may determine the dimension of the each embedding layer 111 respectively based on the number of feature values of the feature input to the each embedding layer 111. For example, the training device 230 may determine the dimension d of the embedding layer 111 to be proportional to the number c of the feature values of the feature input to the embedding layer 111. For example, the training device 230 may set the dimension $d=\alpha \times c^{\beta}$, and $\alpha$ and $\beta$ may be constants determined based on experience, experiments, or device resources or the like. For example, $\alpha$ may be set to 6, and $\beta$ may be set to $\frac{1}{4}$.

As another example, the training device 230 may also determine the dimension of the each embedding layer 111 based on information entropy of the feature input to the each embedding layer 111. Specifically, the information entropy s corresponding to the feature input to the embedding layer 111 may be determined based on the following equation (1):

$$s = -\sum_{i=0}^{n} p_i \log p_i \quad (1)$$

Wherein, in equation (1), n is the total number of all different feature values of this feature (such as the number of different cities occurring in all samples, in "city" feature) in the set of the training samples, $p_i = f_i/m$, where $f_i$ represents the occurrence times in samples of the i-th feature value of the feature input to the embedding layer 111, and m represents the total number of the corresponding samples.

After obtaining the respective information entropy s of the feature respectively corresponding to the each embedding layer 111 according to equation (1), the training device 230 may determine the dimension d of the embedding layer corresponding to the each feature proportionally based on a value of the information entropy s of these features.

Specifically, in the exemplary embodiment of the disclosure, the training device 230 may assign the dimension to the each embedding layer 111 in direct proportion to the values of the information entropy s corresponding to the feature input to the each embedding layer 111.

In addition, in the above assignment process, the training device 230 may allow the assigned embedding layer dimension to be between a preset minimum dimension a and a preset maximum dimension b, by further fully considering factors such as computing resources, data amount of the training data record, and an application scenario of the neural network model, in combination with a preset dimension assignment constraints, wherein a is smaller than b, and both are natural numbers. For example, the training device 230 may set the dimension d=min(b, max(a,d)) of the each embedding layer 111, wherein the minimum dimension a and the maximum dimension b may be determined by the user based on experience, or may also be determined based on at least one of the computing resources, the data amount of the training data record, and the application scenario of the neural network model.

After completing the assigning of the dimension according to the above method, if the assigned dimension of the embedded layer 111 meets a preset condition (for example, the sum of the dimensions of all the embedded layers 111 is not greater than a preset total dimension), the assigning may be considered to be valid. If the preset condition is not met, for example, if the sum of the assigned dimensions of all the embedding layers 111 is greater than the preset total dimension, the training device 230 needs to assign the dimension again. In the exemplary embodiment of the disclosure, the preset total dimension may be determined based on at least one of the computing resources, the data amount of the training data record, and the application scenario of the neural network model.

Just as an example, when the training device 230 reassigns the dimension of the embedding layer 111, it may first set the maximum dimension b and the minimum dimension a to be assigned to the each embedding layer 111. After determining the minimum dimension a and the maximum dimension b, the training device 230 may determine the embedding layer 111 corresponding to a first predetermined number of features with the lowest information entropy to be assigned the minimum dimension a, and the embedding layer 111 corresponding to a second predetermined number of features with the highest information entropy to be assigned the maximum dimension b. After that, for a remaining feature except the first predetermined number of features and the second predetermined number of features, the training device 230 may assign a remaining dimension (that is, the dimension remaining after the preset total dimensions minus the dimension assigned to the embedding layer 111 respectively corresponding to the first predetermined number of features and the second predetermined number of features) proportionally according to the values of the information entropy of the remaining feature, between the minimum dimension a and the maximum dimension b, thereby determining the dimension assigned to the embedding layer 111 respectively corresponding to the remaining feature.

In this way, a plurality of dimension assignment solutions (i.e., an optimal solution regarding the first predetermined number and the second predetermined number) may be obtained by enumerating the first predetermined number and the second predetermined number. In this regard, the training device 230 may determine the optimal dimension assignment solution among the plurality of dimension assignment solutions according to a predetermined rule. Just as an example, in the exemplary embodiment of the disclosure, the training device 230 may determine the solution corresponding to a case when a variance value of the dimension of the embedding layer 111 is the smallest or the largest as the optimal dimension assignment solution, that is, the optimal solution corresponds to minimizing or maximizing the variance value of the dimension assigned to the each embedding layer. However, it should be understood that the application is not limited to this, and the training device 230 may also determine the optimal dimension assignment solution according to various other rules.

For example, the training device 230 may also learn the dimension of the each embedding layer 111 based on a dimension learning model, apart from assigning the dimension of the each embedding layer 111 proportionally according to the information entropy as described above. In the exemplary embodiment of the disclosure, the dimension learning model may be designed to iteratively learn an optimal dimension of the each embedding layer by a candidate dimension of the each embedding layer 111 and the model effect of the neural network model (for example, a model AUC (Area under the Curve of ROC (receiver operating characteristic curve), etc.) corresponding to the candidate dimension, and determine the learned optimal dimension of the each embedding layer 111 as the dimension of the each embedding layer 111. Just as an example, the dimension learning model may be based on reinforcement learning or Bayesian optimization. However, the disclosure is not limited to this, and the dimension learning model may also be any other available machine learning model.

In the exemplary embodiment of the disclosure, since the dimension of the each embedding layer 111 of the plurality of embedding layers 111 is determined separately in training the neural network model 100, the dimensions of the plurality of embedding layer 111 may be adaptively determined without having the same dimension as each other.

Continuing to refer to FIG. 1, after the embedding layer 111 is passed through, the training device 230 may also make the feature embedding vector output by the each embedding layer 111 pass through the corresponding underlayer neural network model 112, and learn the feature information representation of the corresponding feature by the corresponding under-layer neural network model 112. Here, as an example, the under-layer neural network model may be a DNN model. In this way, it is possible to automatically control the amount of information input to the neural network model based on information corresponding to the feature itself, thereby further improving the prediction effect of the neural network model.

In addition, for the continuous feature in the training sample, since the embedding layer 111 may not be passed through, the training device 230 may also directly make at least one continuous feature of the training sample pass through the corresponding under-layer neural network model 112, and learn the feature information representation of the corresponding continuous feature by the corresponding under-layer neural network model 112.

Figure 4:
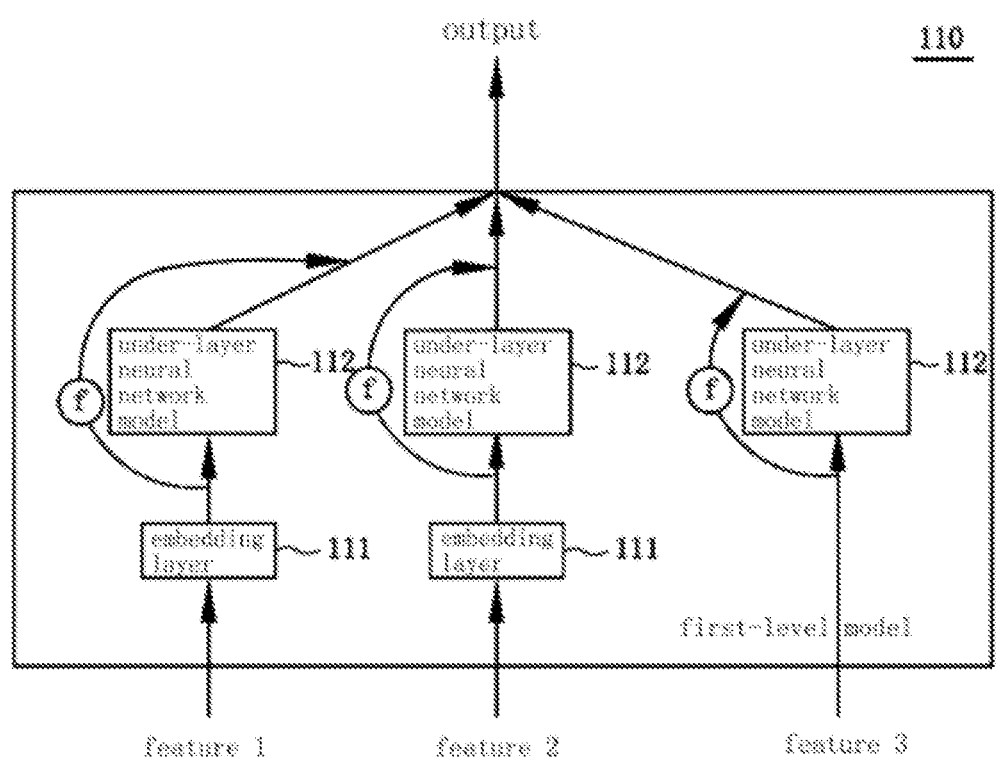
FIG. 4 is a diagram illustrating a first-level model according to another exemplary embodiment of the disclosure.

However, considering that different features have different prediction capabilities for the target, in order to fully extract the information of the feature itself, in the exemplary embodiment of the disclosure, the training device 230 may also perform a function operation on the feature embedding vector output by the embedding layer 111 with an output of the corresponding under-layer neural network model 112 respectively, and use a result of the function operation as the feature information representation learned by the corresponding under-layer neural network model 112 (for example, the processing for feature 1 and feature 2 as shown in FIG. 4). Alternatively, for the continuous feature in the training sample (i.e., the continuous feature that is not subject to a discretization process), the training device 230 may perform the function operation on the continuous feature with the output of the corresponding under-layer neural network model 112, and use the result of the function operation as the feature information representation output by the corresponding under-layer neural network model 112 (for example, the processing for feature 3 as shown in FIG. 4).

Through the above function operation, in training the neural network model 100, the prediction capability of the each feature for the target may be effectively used, so that more important features may play a greater role for the prediction result, and the less important features play a smaller role for the prediction result, or even not work. Specifically, the output of the under-layer neural network model 112 may be regarded as a certain representation for the amount of information of the feature, and the learning effect of the neural network model may be further ensured by adjusting actual content of the feature finally entering into the second-level model 120 by the output of the under-layer neural network model 112 together with the feature embedding vector.

In addition, in the exemplary embodiment of the disclosure, the function used in the above-mentioned function operation may be in the form of Out=f(E,O), where E represents the feature embedding vector or the continuous feature output by the embedding layer 111, and O represents the feature embedding vector E or the output after the continuous feature passes through the corresponding under-layer neural network model 112. Just as an example, the function operation may be a bitwise addition operation or a bitwise multiplication operation. For example, in the example where f(E, O) represents an operation relationship of multiplying E and O by bit, the O is regarded as a switch for controlling the inflow amount of information of E. However, it should be understood that, in the exemplary embodiment of the disclosure, the function operation may also have other different function expression forms specified in advance, and is not limited to the above-mentioned bitwise addition operation or bitwise multiplication operation, for example, the function may also be a complex operation such as Out=f(E,O)=a*$f_e$(E)+b*$f_o$(O), where f, $f_e$, and $f_o$ may all be arbitrary operation functions. Here, the parameters of the function operation (for example, the above a and b) may be learned in training the neural network model based on the training sample.

In addition, in learning the feature information representation of the corresponding feature by the under-layer neural network model 112, the feature embedding vector input from the embedding layer 111 to the under-layer neural network model 112 and the output of the corresponding under-layer neural network model 112 may have different dimensions. That is, it will further bring flexibility to the model by a change in the dimension of the feature. However, if the function operation is to be performed, in this case that the feature embedding vector output by the embedding layer 111 and the output of the corresponding under-layer neural network model 112 have different dimensions, unification of dimensions is performed for the feature embedding vector output by the embedding layer 11 with the output of the corresponding under-layer neural network model 112, and then the function operation is performed on the feature embedding vector with the output of the corresponding under-layer neural network model 112 for which the unification of dimensions has been performed.

As just an example, placeholder filling may be performed on at least one of the feature embedding vector output by the embedding layer 111 and the output of the corresponding under-layer neural network model 112, so that the feature embedding vector output by the embedding layer 111 and the output of the corresponding under-layer neural network model 112 are the same in dimension.

As another example, at least one of the feature embedding vector output by the embedding layer 111 and the output of the corresponding under-layer neural network model 112 may be multiplied by a transformation matrix, so that the feature embedding vector output by the embedding layer 111 and the output of the corresponding under-layer neural network model 112 are the same in dimension. In the exemplary embodiment of the disclosure, such a transformation matrix may be learned in training the neural network model 100 by the training device 230 based on the training samples.

Continuing to refer to FIG. 1, the feature information representation output from the first-level model 110 may be used as at least one input item of the second-level model 120.

According to the exemplary embodiment of the disclosure, the second-level model 120 may include the plurality of intermediate models 120-1 to 120-N. Correspondingly, the training device 230 may learn the interaction representation between the corresponding input items respectively by the plurality of intermediate models 120-1 to 120-N included in the second-level model 120. Just as an example, the corresponding input item includes at least one of the feature information representations output by the first-level model 110.

In addition, alternatively, in the exemplary embodiment of the disclosure, the input items of the second-level model 120 may further include at least one feature embedding vector output from respective embedding layer 111 of the first-level model 110 and/or at least one original feature (i.e., an original discrete feature or an original continuous feature) itself. In other words, in the exemplary embodiment of the disclosure, the training device 230 may learn the interaction representation between corresponding at least one feature information representation, at least one feature embedding vector and/or at least one original feature by the plurality of intermediate models 120-1 to 120-N included in the second-level model 120.

Preferably, in the exemplary embodiment of the disclosure, a type of the intermediate model and its corresponding input items (i.e., at least one feature embedding vector, at least one feature information representation, and/or at least one original feature) may be determined according to characteristics of the features (for example, the characteristics of the original continuous feature and/or the original discrete feature itself, the characteristics of the feature embedding vector corresponding to the original feature (i.e., the original continuous feature and/or the original discrete feature) and/or the characteristics of the feature information representation corresponding to the original feature), composability of the features and/or learning ability characteristics of various types of models.

Here, for each intermediate model, at least a part of the input of the each intermediate model may be obtain by performing at least one of conversion, splicing, and an operation on at least one of the input items (i.e., at least one feature information representation, at least one feature embedding vector, and/or at least one original feature corresponding to the each intermediate model) corresponding to the each intermediate model. The operation may include performing a summation operation, an average operation, a maximum pooling operation, and/or a weighting operation based on an attention mechanism on at least one original or converted input item corresponding to the each intermediate model. In the exemplary embodiment of the disclosure, the weighting operation based on the attention mechanism may be performed via a dedicated attention mechanism network, that is, one or more sets of weights for the at least one original or converted input item may be learned via the dedicated attention mechanism network, and the at least one original or converted input item is weighted respectively based on the one or more sets of the weights.

Referring back to FIG. 1, in the exemplary embodiment of the disclosure, the plurality of intermediate models 120-1 to 120-N may be at least one of a full-input neural network model (for example, a deep neural network (DNN) model), a combined feature neural network model (i.e., a Crossfeature neural network model), a model based on a factorization mechanism (for example, a DNN model based on FM feature), and the like. Just as an example, the input of the full-input neural network model may be a result of splicing of all the input items, and the input of the combined feature neural network model may be a result of the splicing of the input items corresponding to the features capable of being combined among all the input items (here, as an example, the combined feature neural network model may include a logistic regression model, that is, the logistic regression model may be regarded as a single-layer combined feature neural network model), and the input of the model based on the factorization mechanism may be an operation result obtained by adding, after multiplying any two of all the input items by bit, results of multiplying by bit. Here, as an example, the input of the each intermediate model is not limited to the feature information representation, but may also include the feature embedding vector output by the embedding layer 111 and/or the original feature itself, so that: while the interaction representation between at least one corresponding part of the feature information representations is learned respectively, the interaction representation between the feature embedding vector and/or the original feature and these feature information representations is further learned.

After that, the training device 230 may learn the prediction result at least based on the interaction representation output by the second-level model 120 by the top-layer neural network model as the third-level model 130 of the neural network model 100. In the exemplary embodiment of the disclosure, the third-level model 130 may include a single top-layer neural network model. The single top-layer neural network model may be any usually common neural network model, or may also be any variation of the common neural network structure.

In addition, alternatively, in addition to the interaction representation output by the second-level model 120, the input of the third-level model 130 may also include at least one feature information representation output by the first-level model 110, at least one feature embedding vector output by the one or more embedding layers 111, at least one original discrete feature, and/or at least one original continuous feature. That is to say, in the exemplary embodiment of the disclosure, the training device 230 may learn the prediction result based on at least one interaction representation output by the second-level model 120, at least one feature information representation output by the first-level model 110, at least one feature embedding vector output by the one or more embedding layers 111, and/or at least one original feature, by the top-layer neural network model as the third-level model 130 of the neural network model 100.

In addition, alternatively, at least a part of input of the top-layer neural network model may be obtained by performing at least one of splicing and an operation on the at least one interaction representation output by the second-level model 120, the at least one feature information representation output by the first-level model 110, the at least one feature embedding vector output by the one or more embedding layers 111, and/or the at least one original feature.

The training device 230 may adjust the neural network model 100 including the three-level model at least based on the difference between the prediction result output by the third-level model 130 and the label of the training sample.

In the existing neural network model, when the neural network model is trained using the training sample, the prediction result $y_{pred}$ is usually obtained in an output layer of the model. Then, loss may be calculated according to a specified loss function based on the value of the prediction result $y_{pred}$ of the neural network model and the true label $y_{true}$ of the training sample (that is, the actual result of the prediction target of the neural network model), and then backpropagation is performed, thereby completing parameter updating of the neural network model. However, as the number of layers of neural network model increases, it may be difficult to improve the performance of the neural network as expected.

According to the exemplary embodiment of the disclosure, for at least a part of layers in a main neural network structure in the neural network model 100, the training device 230 may obtain a layer prediction result corresponding to an output of each layer respectively. Here, the main neural network structure does not include the output layer. In this way, supervision information may be introduced in each layer of the neural network to construct a deep neural network with layer-by-layer supervision, thereby being capable of further improving the prediction effect of the neural network model.

As an example, the main neural network structure may include all layers except for the output layer of the neural network model 100, or the main neural network structure may include each layer that plays a primary prediction role except for the output layer of the neural network model 100. Here, according to the exemplary embodiment of the disclosure, the neural network model 100 is a composite neural network including three level structures. To this end, the main neural network structure may be determined according to an artificial designation made by a user based on the understanding of a model algorithm, a data situation and/or an application scenario of the model, and the part of the neural network that plays the primary prediction role may also be determined as the main neural network structure by means of testing. For example, the main neural network structure may include at least a part of layers of the entire neural network model 100 except for the output layer, and these layers may be located at the same level or different levels.

In the exemplary embodiment of the disclosure, the output layer of the neural network model 100 may refer to the output layer of the third-level model 130, and at least one or more of other neural network layers of the neural network model 100 may be considered to be included in the main neural network structure.

In addition, in the exemplary embodiment of the disclosure, the training device 130 may obtain the layer prediction result corresponding to the each layer by respectively converting the output of the each layer in at least a part of the layers in the main neural network structure at least once. Just as an example, during the converting, the training device 130 may perform the converting once by multiplying a layer weight matrix of the each layer with the output of the each layer respectively, and adding a result of multiplying to a corresponding layer bias item. As an example, the above-mentioned layer weight matrix and the bias item both may be used as parameters of the loss function to be learned parameter values during the training, or the bias item may also be set to a constant (or even 0) without learning.

Here, according to the actual situation, the above conversion result may be directly used as the layer prediction result or as input of an activation function, and the output of the activation function may be used as the layer prediction result.

Specifically, just as an example, it is assumed that the output of the i-th layer (non-output layer) of the main neural network structure is a matrix $H_i$ having a size of $b \times h_i$ (i.e., $H_i \in R^{b \times h_i}$), where b is batch size, $h_i$ is the number of network neurons in the i-th layer, the layer prediction result corresponding to the i-th layer may be $y_i = W_i^T H_i + b_i$ or $y_i = f(W_i^T H_i + b_i)$, where f is the activation function (for example, sigmoid function, tan h function, etc.), the parameter $W_i$ is the layer weight matrix of $h_i \times 1$, and the parameter $b_i$ is the bias item of $1 \times 1$. Here, as a special case, $b_i$ may be a constant and may even be 0.

In addition, although it is shown herein that the output $H_i$ of the i-th layer (i is a natural number) is converted once to obtain the layer prediction result, the disclosure is not limited to this, and the output $H_i$ of the i-th layer may also be converted more times. Just as an example, the result obtained by the first time of converting (a converting result or an output result of the converting result through the activation function) may be used as an input variable for performing the second time of converting again, and so on, finally, the layer prediction result $y_i$ is obtained. In addition, it should be noted that when the converting are performed more times, the type of the activation function f and its parameters (for example, the layer weight matrix $W_i$ and the bias item $b_i$) used in each time of converting may be the same or different. Here, by introducing the layer prediction result into the loss function, the layer weight matrix $W_i$ and the bias item $b_i$ may be learned in training the neural network model.

After obtaining the layer prediction result of the corresponding layer of the main neural network structure, the training device 230 may construct a model loss function based on the difference between the prediction result $y_{out}$ output by an output layer of the neural network model 100 and the label $y_{true}$ of the training sample, and a layer prediction difference between each layer prediction result and the label $y_{true}$ of the training sample, and adjust the neural network model according to the model loss function.

The process of constructing the model loss function will be described in detail below in conjunction with the example of FIG. 5.

Figure 5:
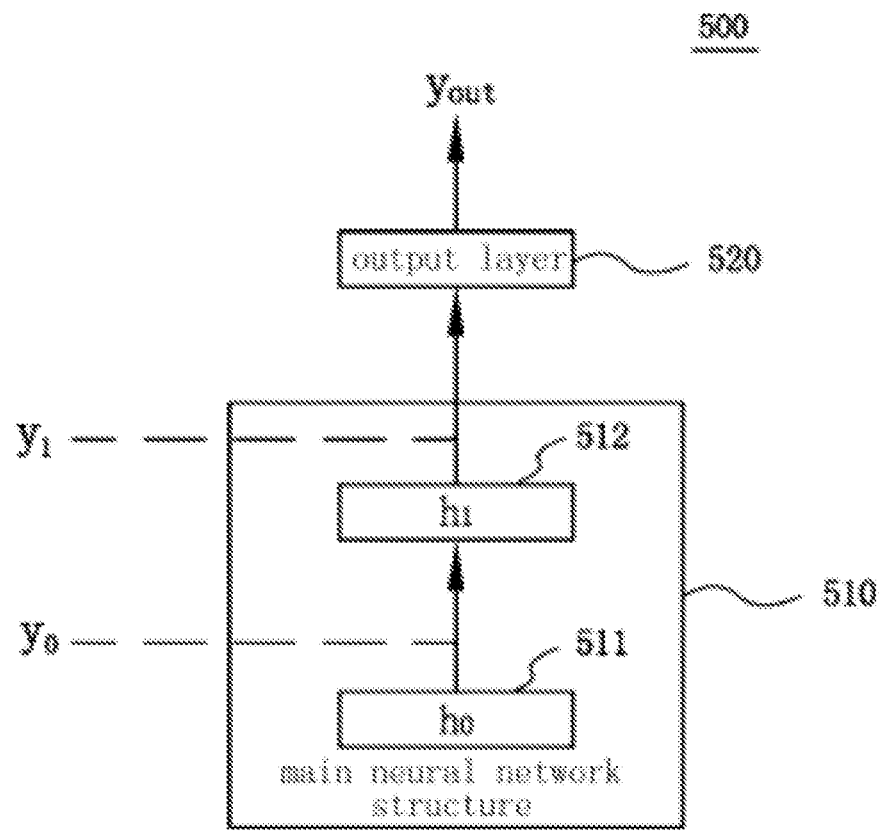
FIG. 5 is a schematic diagram illustrating the neural network model with a plurality of neural network layers according to an exemplary embodiment of the disclosure.

FIG. 5 is a schematic diagram illustrating the neural network model having a plurality of neural network layers according to an exemplary embodiment of the disclosure.

Here, for the convenience of explanation, it is assumed that the neural network model 500 is a simplified diagram of the neural network model 100, and the level structure therein is weakened. As shown in FIG. 5, the neural network model 500 may include a main neural network structure 510 and an output layer 520. The main neural network structure 510 may include a plurality of intermediate layers $h_0$ 511 and $h_1$ 512, etc., and the output $y_{out}$ of the output layer $h_2$ 520 is the prediction result of the neural network model 500. It should be understood that the plurality of intermediate layers $h_0$ 511 and $h_1$ 512, etc. may cover at least a part of network layers of the under-layer neural network model, the intermediate model, and/or the top-layer neural network model located in each level.

Referring to FIG. 5, the training device 230 may obtain corresponding layer prediction results for at least one middle layers $h_0$ 511 and $h_1$ 512, etc. of the main neural network structure 510, respectively, for example, the layer prediction result $y_0$ for the middle layer $h_0$ 511 and the layer prediction result $y_1$ for the middle layer $h_1$ 512 or the like. Then, the model loss function L may be constructed based on the difference between the prediction result $y_{out}$ output by the output layer $h_2$ 520 of the neural network model 500 and the label $y_{true}$ of the training sample, and the layer prediction difference between respective prediction result $y_0$ and $y_1$, etc. and the label $y_{true}$.

In the exemplary embodiment of the disclosure, the model loss function L may be constructed according to the following equation (2):

$$L = l_{out}(y_{out}, y_{true}) + w_0 * l_0(y_0, y_{true}) + w_1 * l_1(y_1, y_{true}) \qquad (2)$$

Wherein, $l_{out}$ represents the output layer loss function, $l_0$ and $l_1$ represent layer loss functions of the intermediate layers $h_0$ 511 and $h_1$ 512, respectively, and $w_0$ and $w_1$ represent the weights of the loss functions corresponding to the intermediate layers $h_0$ 511 and $h_1$ 512, respectively. That is, the output layer loss function may be constructed based on the difference between the prediction result output by the output layer 520 of the neural network model and the label $y_{true}$, and the layer loss function of each layer may be constructed based on the layer prediction difference between each layer prediction result and the label $y_{true}$, and the model loss function is constructed by weighted summing of the output layer loss function and each layer loss function.

In the exemplary embodiment of the disclosure, the values of $w_0$ and $w_1$ may be changed according to a predetermined rule, for example, the values of $w_0$ and $w_1$ may be set to change regularly (for example, attenuate according to each iteration in training the neural network model), or may be learned in training the neural network model (for example, learned by a dedicated attention mechanism network).

In addition, in the exemplary embodiment of the disclosure, after obtaining the model loss function L, various variables that are able be learned in the neural network model, such as the layer weight matrix, the bias item, and attention operation-related weights, may be learned by methods such as gradient descent. Just as an example, in the above learning, derivative of L to the layer weight matrix $W_i$ may be calculated to update $W_i$.

In addition, in the example of FIG. 5, it is shown that the main neural network structure 510 includes two middle layers $h_0$ 511 and $h_1$ 512, and both the prediction result $y_0$ for the middle layer $h_0$ 511 and the prediction result $y_1$ for the middle layer $h_1$ 512 are used in calculating the loss function L, but the disclosure is not limited to this. The main neural network structure 510 may include more intermediate layers due to a specific structure of the neural network model, and when there are a plurality of intermediate layers, only layer prediction results for a part of the plurality of intermediate layers may be used.

Alternatively, in the exemplary embodiment of the disclosure, in training the neural network model 500 by the training device 230, a function type of each layer loss function may be dynamically set for different batches of the training samples, and/or, specific layers involved in the above-mentioned calculating of loss in the main neural network structure are also dynamically set for different batches of the training samples.

Just as an example, when optimizing the model based on a series of gradient descent algorithms, the forms of $l_{out}$, $l_0$, and $l_1$ may be different to further increase randomness. For example, $l_o$ may be a cross entropy loss function, and h may be a hinge loss function. For example, only $l_{out}$ and $l_o$ exist for a first batch of the training samples, but all of $l_{out}$, $l_0$, and $l_1$ exist for a second batch of the training samples. As an example, the layer loss function may be selected for each batch of data in the following way. For example, assuming that the total number of layers involved in the loss function (including the output layer and each intermediate layer) is k, then a sequence composed of k 0 or 1 may be sampled from a specific distribution (for example, binomial distribution), and the sequence is multiplied by the loss function composed of the output layer loss function or each layer loss function, thus, the part multiplied by 0 is discarded and the corresponding loss is not calculated.

According to the above method, the neural network model 100 may be better trained, and thus a higher prediction effect may be obtained.

After completing the training of the neural network model 100 based on the training data record, the trained neural network model 100 may be used to make a prediction using a prediction data record.

Figure 6:
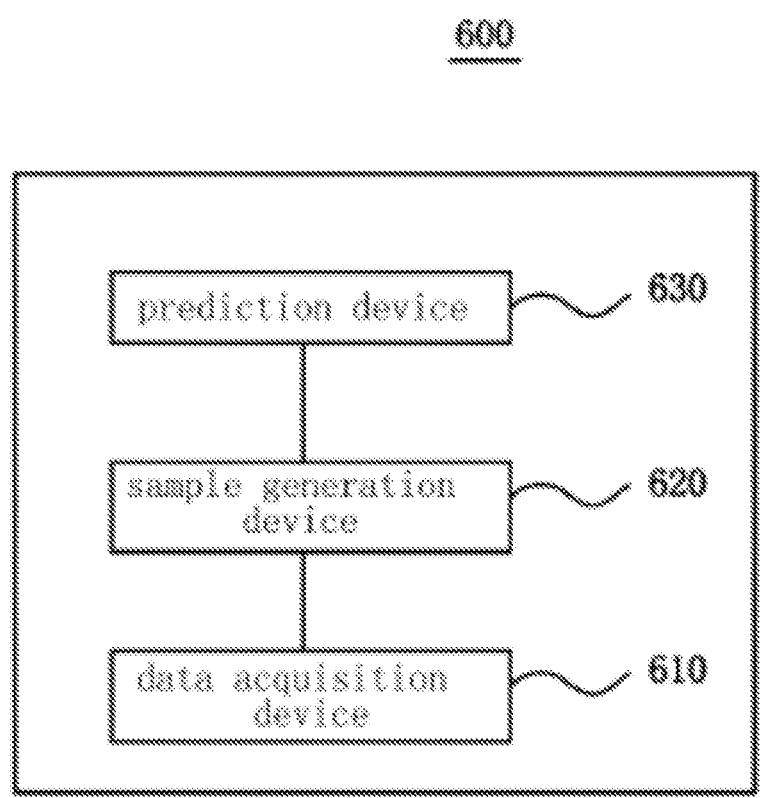
FIG. 6 illustrates a prediction system of the neural network model according to an embodiment of the disclosure.

FIG. 6 illustrates a prediction system 600 of a neural network model according to an embodiment of the disclosure.

Referring to FIG. 6, the prediction system 600 may include: a data acquisition device 610 configured to acquire a prediction data record; a sample generation device 620 configured to generate features of a prediction sample based on attribute information of the prediction data record acquired by the data acquisition device 610; and a prediction device 630 configured to provide a corresponding prediction result for the prediction sample generated by the sample generation device 620 using the trained neural network model. Here, the data acquisition device 610 may acquire the prediction data record from any data source in a manual, automatic or semi-automatic manner; Correspondingly, the sample generation device 620 may generate the features of the prediction sample in a manner consistent with the sample generation device 220 in the training system 200, except that the prediction sample does not have the label.

In the embodiment of the disclosure, the neural network model used by the prediction device 630 may be the neural network model 100 trained by the training system 200 and the training method of the neural network model as described above. Since the mechanism of performing processes based on the neural network model has been described previously, it will not be described in more detail here.

Figure 7:
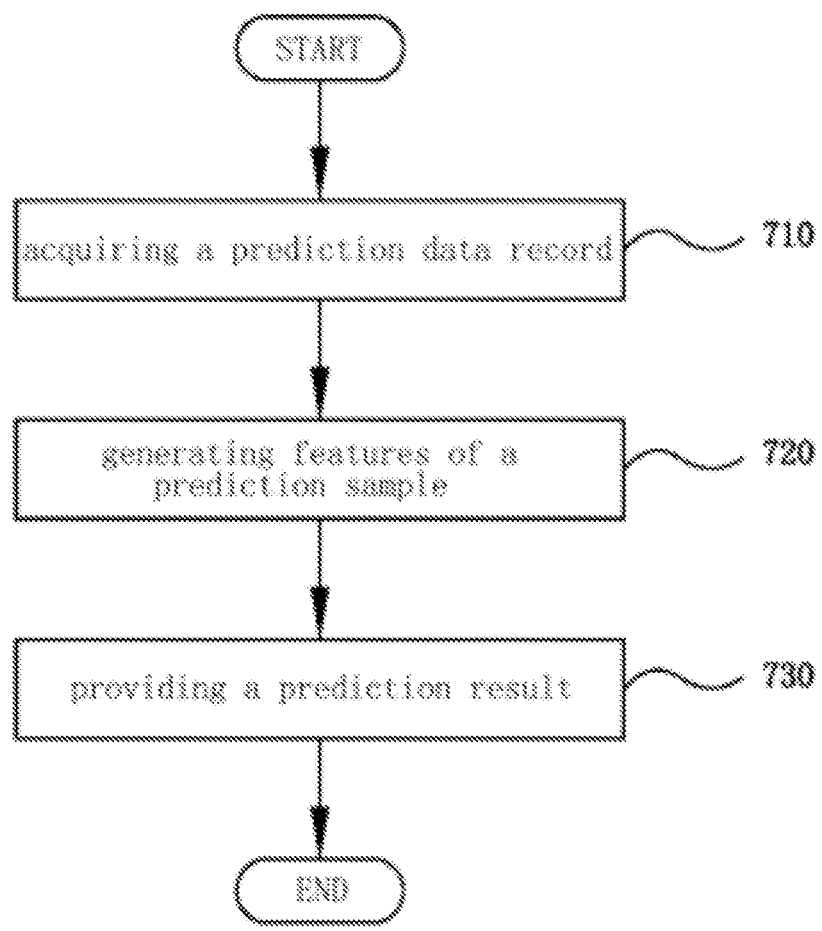
FIG. 7 is a flowchart illustrating a prediction method of the neural network model according to an embodiment of the disclosure.

FIG. 7 is a flowchart illustrating a prediction method 700 of a neural network model according to an embodiment of the disclosure.

Referring to FIG. 7, in step 710, the data acquisition device 610 may acquire the prediction data record.

In the embodiment of the disclosure, the prediction data record and the training data record are the same type of data record. That is, the neural network model 100 trained by the training system 200 and the training method of the neural network model as described above is trained with what type of data, then the same type of prediction data will be used for prediction. For example, in the OCR scenario, the training data is image data and its label (the label is text in the image), then the prediction data is also the image data containing text.

Here, as an example, the prediction data record may be collected by a manual, a semi-automatic or a fully automatic manner, or the collected original data may be processed so that the processed data record has an appropriate format or form. As an example, data may be collected in batches.

Here, the data record manually input by the user may be received by an input device (for example, a workstation). In addition, the data record may be systematically retrieved from the data source in the fully automatic manner, for example, systematically requesting the data source by a timer mechanism implemented in software, firmware, hardware, or a combination thereof and obtaining the requested data from the response. The data source may include one or more databases or other servers. The manner of fully automatically acquiring data may be realized via an internal network and/or an external network, which may include transmitting encrypted data via internet. When the server, the database, the network, etc. are configured to communicate with each other, data collection may be performed automatically without manual intervention, but it should be noted that there may still be certain user input operations in this way. The semi-automatic manner is between the manual manner and the fully automatic manner. The difference between the semi-automatic manner and the fully automatic manner is that a trigger mechanism activated by the user replaces, for example, the timer mechanism. In this case, the request to extract data is generated only when a specific user input is received. Each time data is acquired, preferably, the captured data may be stored in a non-volatile memory. As an example, the original data collected during acquisition and the processed data may be stored by using a data warehouse.

The data record acquired above may come from the same or different data sources, that is, each data record may also be a splicing result of the different data records. For example, in addition to acquiring an information data record (including attribute information fields such as income, education, position, and asset status, etc.) filled in when a customer applies to a bank to open a credit card, as an example, other data records of the customer in the bank (for example, a loan record, daily transaction data, etc.) may also be acquired, and these acquired data records may be spliced into a complete data record. In addition, data from other private or public sources, such as data from data providers, data from the internet (for example, social networking sites), data from mobile operators, data from APP operators, data from courier companies, data from credit agencies, etc. may also be acquired.

Alternatively, the collected data may be stored and/or processed (for example, storage, classification, and other offline operations) by means of a hardware cluster (such as a Hadoop cluster, a Spark cluster, etc.). In addition, the collected data may also be performed an online stream processing.

As an example, unstructured data such as text may be converted into structured data that is easier to use for further processing or referencing. Text-based data may include emails, documents, web pages, graphics, spreadsheets, call center logs, transaction reports, etc.

Then, in step 720, the feature of the prediction sample may be generated by the sample generation device 620 based on the attribute information of the prediction data record acquired in step 710.

After that, in step 730, a corresponding prediction result for the prediction sample generated in step 720 is provided by the prediction device 630 by using the neural network model that has been trained.

In the embodiment of the disclosure, the neural network model used in step 730 may be the neural network model 100 trained by training system 200 and the training method of the neural network model as described above, since the mechanism of performing processes based on the neural network model has been described previously, it will not be described in more detail here.

The training method and system of the neural network model and the prediction method and system according to the exemplary embodiments of the disclosure have been described above with reference to FIGS. 1 to 7. However, it should be understood that devices, systems, units, etc. used in FIGS. 1 to 7 may be respectively configured as software, hardware, firmware, or any combination of the foregoing items to perform specific functions. For example, these systems, devices or units may correspond to dedicated integrated circuits, may also correspond to pure software codes, or may correspond to modules into which software and hardware are combined. In addition, one or more functions implemented by these systems, devices, or units may also be uniformly performed by components in physical devices (for example, processors, clients, or servers, etc.).

In addition, the above-mentioned method may be implemented by a program recorded on a computer-readable medium, for example, according to the exemplary embodiment of the application, a computer-readable medium, on which a computer program for performing the following method steps by one or more computing devices is recorded, may be provided: acquiring a training data record, generating features of a training sample based on attribute information of the training data record, and using a label of the training data record as a label of the training sample; and training the neural network model using a set of the training samples, wherein, in training the neural network model, learning a feature information representation of each feature itself respectively by a plurality of under-layer under-layer neural network models included in a first-level model of the neural network model, learning an interaction representation between corresponding input items respectively by a plurality of intermediate models included in a second-level model of the neural network model, wherein the corresponding input items includes at least one of the feature information representations output by the first-level model, learning a prediction result at least based on the interaction representations output by the second-level model by a top-layer neural network model as a third-level model of the neural network model, and adjusting the neural network model including the three-level model at least based on a difference between the prediction result and the label. In addition, according to another exemplary embodiment of the disclosure, a computer-readable medium, on which a computer program for performing the following method steps by one or more computing devices is recorded, may be provided: acquiring a prediction data record; generating features of a prediction sample based on attribute information of the prediction data record; and providing a corresponding prediction result for the prediction sample using the neural network model trained by the aforementioned training method.

The disclosure provides a computer-readable storage medium storing instructions, wherein the instructions, when executed by at least one computing device, cause the at least one computing device to perform the training method of the neural network model including the three-level model in any embodiment of the disclosure.

The disclosure also provides a computer-readable storage medium storing instructions, wherein the instructions, when executed by at least one computing device, cause the at least one computing device to perform the method of performing a prediction using the neural network model described in any embodiment of the disclosure.

The computer program in the above-mentioned computer-readable medium may be executed in an environment deployed in computer equipment such as a client, a host, an agent device, a server, etc. It should be noted that the computer program may also be used to perform additional steps in addition to the above-mentioned steps or perform more specific processing when the above steps are performed. These additional steps and the further processing have been mentioned in the description of the related method with reference to FIGS. 1 to 7, therefore, the description will not be repeated here in order to avoid repetition.

It should be noted that the training method and system of the neural network model according to the exemplary embodiments of the disclosure may completely rely on execution of the computer program to realize a corresponding function, that is, each unit or device corresponds to each step in functional architecture of the computer program, so that the entire device or system is called through a special software package (for example, a lib library) to implement the corresponding function.

On the other hand, when various units or devices mentioned in FIGS. 1 to 7 are implemented in software, firmware, middleware or microcode, program codes or code segments used to perform corresponding operations may be stored in a computer-readable medium such as a storage medium, so that a processor may perform the corresponding operations by reading and executing the corresponding program codes or code segments.

For example, a system implementing the training method of the neural network model according to an exemplary embodiment of the disclosure may include one or more computing devices and one or more storage devices, wherein instructions are recorded on the one or more storage devices, and wherein the instructions, when executed by the one or more computing devices, cause the one or more computing devices to: acquire a training data record; generate features of a training sample based on attribute information of the training data records and using a label of the training data record as a label of the training sample; and train the neural network model using a set of the training samples, wherein, in training the neural network model, learning a feature information representation of each feature itself respectively by a plurality of under-layer neural network models included in a first-level model of the neural network model, learning an interaction representation between corresponding input items respectively by a plurality of intermediate models included in a second-level model of the neural network model, wherein the corresponding input items include at least one of the feature information representations output by the first-level model, learning a prediction result at least based on the interaction representations output by the second-level model by a top-layer neural network model as a third-level model of the neural network model, and adjusting the neural network model including the three-level model at least based on a difference between the prediction result and the label. In addition, according to another exemplary embodiment, a system implementing the prediction method of the neural network model according to an exemplary embodiment of the disclosure may include one or more computing devices and one or more storage devices, wherein instructions are recorded on the one or more storage devices, and wherein the instructions, when executed by the one or more computing devices, cause the one or more computing devices to: acquire a prediction data record; generate features of a prediction sample based on attribute information of the prediction data record; and provide a corresponding prediction result for the prediction sample using the neural network model trained by the aforementioned training method.

The disclosure includes a system comprising at least one computing device and at least one storage device storing instructions for training a neural network model including a three-level model, wherein the instructions, when executed by the at least one computing device, causes the at least one computing device to perform the training method of the neural network model including the three-level model in any embodiment of the disclosure.

The disclosure provides a prediction system including at least one computing device and at least one storage device storing instructions, wherein the instructions, when executed by the at least one computing device, cause the at least one computing device to: acquire a prediction data record; generate features of a prediction sample based on attribute information of the prediction data record, and provide a corresponding prediction result for the prediction sample using the neural network model trained by the training method of the neural network model including the three-level model in any embodiment of the disclosure.

Specifically, the above system may be deployed in the server, or deployed on a node device in a distributed network environment. In addition, the system may also include a video display (such as a liquid crystal display) and a user interaction interface (such as a keyboard, a mouse, a touch input device, etc.). All components of the system may be connected to each other via a bus and/or the network.

Here, the system does not have to be a single device, and may also be any device or an aggregation of circuits that may execute the above instructions (or instruction sets) individually or jointly. The system may also be a part of an integrated control system or a system manager, or may be configured as a portable electronic device interconnected by an interface locally or remotely (e.g. via wireless transmission).

In the system, the computing device for performing the training method or prediction method of the neural network model according to the exemplary embodiment of the disclosure may be a processor, and such processor may include a central processing unit (CPU), a graphics processing processor (GPU), a programmable logic device, a dedicated processor system, a microcontroller or a microprocessor. As an example and not limitation, the processor may also include an analog processor, a digital processor, a microprocessor, a multi-core processor, a processor array, a network processor, etc. The processor may execute instructions or codes stored in one of the storage devices which may also store data. The Instructions and the data may also be sent and received by a network interface device via the network, wherein the network interface device may use any known transmission protocols.

The storage device may be integrated with the processor, for example, RAM or flash memory is arranged in an integrated circuit microprocessor or the like. In addition, the storage device may include a stand-alone device, such as an external disk drive, a storage array, or any other storage device that may be used by a database system. The storage device and the processor may be operatively coupled, or may communicate with each other through, for example, an I/O port, a network connection, etc., so that the processor may read files stored in the storage device.

It should be noted that the exemplary implementation of the disclosure focuses on solving the problems of low versatility and low accuracy of current algorithms. Specifically, in order to increase the ease of use and the versatility of the algorithms, the implementation of the exemplary embodiments of the disclosure does not rely on any limitation to specific business logic, but focuses on a more general scenario. Unlike most existing solutions, the exemplary embodiments of the disclosure do not focus on one specific scenario, but may be applied to a variety of different scenarios, such as a recommendation system, an advertising system, and so on. On the basis of the exemplary embodiments of the disclosure, modelers may continue to add their own business experience, etc., to further enhance the effect. Therefore, the exemplary embodiments of the disclosure consider abstracting of application scenarios, and are not directed to a specific scenario, but are applicable to various scenarios.

That is to say, according to the exemplary embodiment of the disclosure, the training data or the prediction data may be image data, voice data, data used to describe engineering control objects, data used to describe users (or their behavior), and data used to describe objects and/or events in various fields such as administration, business, medical care, supervision, finance or the like. Accordingly, the model aims to make a prediction with respect to a problem related to the above objects or events. For example, the model may be used to predict image categories, text categories, voice emotions, fraudulent transactions, advertising click rates, etc., so that the prediction result may be directly used as a basis for decision-making or become the basis for decision-making by further being combined with other rules. The exemplary embodiments of the disclosure do not limit specific technical fields involved in a prediction purpose of the model, but the reason is that the model is completely applicable to any specific fields or scenarios that may provide corresponding training data or prediction data, and it does not mean the model cannot be applied to related technical fields.

Furthermore, the scenarios to which the neural network model 100 including the three-level model in the application may be applied include, but are not limited to: image processing scenarios, voice recognition scenarios, natural language processing scenarios, automatic control scenarios, intelligent question-and-answer scenarios, business decision scenarios, recommendation business scenarios, search scenarios and abnormal behavior detection scenarios. The previous description is made reference in detail for more specific application scenarios in the above various scenarios.

Therefore, the training method and system of the neural network model and the prediction method and system of the application may also be applied to any one of the abovementioned scenarios, and there is no difference in the overall execution scheme when they are applied in different scenarios, but the data targeted in the different scenarios are different. Therefore, those skilled in the art may apply solutions of the application to different scenarios without any obstacles based on the foregoing disclosure of the solutions. Thus, there is no need to explain each scenario one by one.

The exemplary embodiments of the application are described above. It should be understood that the foregoing description is only exemplary and not exhaustive, and the application is not limited to the disclosed exemplary embodiments. Many modifications and changes are obvious to those of ordinary skill in the art without departing from the scope and spirit of the application. Therefore, the scope of the application should be subject to the scope of the claims.

What is claimed is:

1. A training method of a neural network model comprising a three-level model performed by at least one computing device, the method comprises:
   acquiring a training data record;
   generating features of a training sample based on attribute information of the training data record, and using a label of the training data record as the label of the training sample; and
   training the neural network model using a set of the training samples,
   wherein, in training the neural network model,
   learning a feature information representation of each feature itself respectively by a plurality of under-layer neural network models comprised in a first-level model of the neural network model,
   learning an interaction representation between corresponding input items respectively by a plurality of intermediate models comprised in a second-level model of the neural network model, wherein the corresponding input items comprise at least one of the feature information representation output by the first-level model,
   learning a prediction result at least based on the interaction representation output by the second-level model by a top-layer neural network model as a third-level model of the neural network model, and
   adjusting the neural network model comprising the three-level model at least based on a difference between the prediction result and the label,
   wherein the learning of the feature information representation of the each feature itself respectively by the plurality of under-layer neural network models comprised in the first-level model of the neural network model comprises:
   making a discrete feature among the features of the training sample and a continuous feature subject to a discretization process pass through a corresponding embedding layer and making a feature embedding vector output by each embedding layer pass through a corresponding under-layer neural network model respectively, and learning the feature information representation of a corresponding feature by the corresponding under-layer neural network model; or
   making the discrete feature among the features of the training sample pass through the corresponding embedding layer and making the feature embedding vector output by the each embedding layer pass through the corresponding under-layer neural network model respectively, and learning the feature information representation of a corresponding discrete feature by the corresponding under-layer neural network model, and making the continuous feature among the features of the training sample pass through the corresponding under-layer neural network model directly, and learning the feature information representation of a corresponding continuous feature by the corresponding under-layer neural network model,
   wherein the training method further comprises: determining a dimension of the each embedding layer respectively, before making the features of the training sample pass through the corresponding embedding layer respectively, by determining the dimension of the each embedding layer proportionally based on a value of information entropy of the feature input to the each embedding layer,
   wherein the determining of the dimension of the each embedding layer proportionally based on a value of the information entropy of the feature input to the each embedding layer comprises:
   setting a maximum dimension and a minimum dimension;
   determining the embedding layer corresponding to a first predetermined number of features with lowest information entropy to be assigned the minimum dimension, and determining the embedding layer corresponding to a second predetermined number of features with highest information entropy to be assigned the maximum dimension; and
   for a remaining feature except the first predetermined number of features and the second predetermined number of features, the dimension of the embedding layer respectively corresponding to the remaining feature is determined proportionally according to the values of the information entropy of the remaining feature between the minimum dimension and the maximum dimension,
   wherein a plurality of dimension assignment solution is obtained by enumerating the first predetermined number of the features and the second predetermined number of the features, and
   wherein an optimal dimension assignment solution is obtained, by determining a solution with a smallest or largest variance of the dimension of the embedding layer among the plurality of dimension assignment solutions, to yield an optimal solution that corresponds to minimizing or maximizing the variance of the dimension.

2. The training method of claim 1, wherein the learning of the feature information representation of the each feature itself respectively by the plurality of under-layer neural network models comprised in a first level model of the neural network model further comprises at least one of:

performing a function operation on the feature embedding vector output by the embedding layer with an output of the corresponding under-layer neural network model respectively, and using a result of the function operation as the feature information representation learned by the corresponding under-layer neural network model; or performing the function operation on the continuous feature among the features of the training sample with the output of the corresponding under-layer neural network model, and using the result of the function operation as the feature information representation output by the corresponding under-layer neural network model.

3. The training method of claim 2, wherein the performing of the function operation on the feature embedding vector output by the embedding layer with the output of the corresponding under-layer neural network model respectively comprises: performing unification of dimensions for the feature embedding vector output by the embedding layer with the output of the corresponding under-layer neural network model, and performing the function operation on the feature embedding vector with the output of the corresponding under-layer neural network model for which the unification of dimensions has been performed.

4. The training method of claim 3, wherein the performing the unification of the dimensions comprises any one of:

performing placeholder filling on at least one of the feature embedding vector output by the embedding layer and the output of the corresponding under-layer neural network model, so that the feature embedding vector output by the embedding layer and the output of the corresponding under-layer neural network model are the same in dimension; or multiplying at least one of the feature embedding vector output by the embedding layer and the output of the corresponding under-layer neural network model by a transformation matrix, so that the feature embedding vector output by the embedding layer and the output of the corresponding underlying neural network model are the same in dimension, wherein the transformation matrix is learned in training the neural network model by using the set of the training samples.

5. The training method of claim 2, wherein parameters of functions used in the function operation are learned in training the neural network model using the set of the training samples.

6. The training method of claim 1, wherein the corresponding input items further comprising at least one of: at least one feature embedding vector output by the embedding layer, at least one original discrete feature, and at least one original continuous feature.

7. The training method of claim 1, wherein the learning of the interaction representation between the corresponding input items respectively by the plurality of intermediate models comprised in the second-level model of the neural network model comprising obtaining at least a part of input of the each intermediate model by performing at least one of conversion, splicing, and an operation on at least one of the input items corresponding to the each intermediate model, wherein the operation comprises performing at least one of a summation operation, an average operation, a maximum pooling operation, and a weighting operation based on attention mechanism on at least one original or converted input item corresponding to the each intermediate model.

8. The training method of claim 1, wherein the learning of the interaction representation between the corresponding input items respectively by the plurality of intermediate models comprised in the second-level model of the neural network model further comprising determining a type of the intermediate model and at least one input item corresponding to the intermediate model according to at least one of characteristic of the features, composability of the features and learning ability characteristics of various types of models, wherein the intermediate model comprises one of:

a full-input neural network model, wherein the input of the full-input neural network model is a result of splicing of all the input items;

a combined feature neural network model, wherein the input of the combined feature neural network model is a result of the splicing of the input items corresponding to the features capable of being combined among all the input items; or a model based on a factorization machine, wherein the input of the model based on the factorization machine is an operation result obtained by adding, after multiplying any two of all the input items by bit, results of multiplying by bit.

9. The training method of claim 1, wherein the learning of the prediction result at least based on the interaction representation output by the second-level model by the top-layer neural network model as the third-level model of the neural network model comprises: learning the prediction result based on at least one of at least one interactive representation output by the second-level model, at least one feature information representation output by the first-level model, at least one feature embedding vector output by the embedding layer, at least one original discrete feature, and at least one original continuous feature by the top-layer neural network model.

10. The training method of claim 9, wherein the learning of the prediction result based on the at least one of the at least one interactive representation output by the second-level model, the at least one feature information representation output by the first-level model, the at least one feature embedding vector output by the embedding layer, the at least one original discrete feature, and the at least one original continuous feature by the top-layer neural network model further comprises: obtaining at least a part of input of the top-layer neural network model, by performing at least one of splicing and an operation on at least one of the at least one interactive representation output by the second-level model, the at least one feature information representation output by the first-level model, the at least one feature embedding vector output by the embedding layer, the at least one original discrete feature and the at least one original continuous feature.

11. The training method of claim 1, wherein the adjusting of the neural network model comprising the three-level model at least based on the difference between the prediction result and the label comprises:

obtaining, for at least a part of layers in a main neural network structure of the neural network model comprising the three-level model, a layer prediction result corresponding to an output of each layer respectively;

constructing a model loss function based on the difference between the prediction result output by an output layer of the neural network model comprising the three-level model and the label, and a layer prediction difference between each layer prediction result and the label; and adjusting the neural network model comprising the three-level model according to the model loss function.

12. The training method of claim 11, wherein the constructing of the model loss function based on the difference between the prediction result output by the output layer of the neural network model comprising the three-level model and the label, and the layer prediction difference between the each layer prediction result and the label, comprises:

constructing an output layer loss function based on the difference between the prediction result output by the output layer of the neural network model comprising the three-level model and the label;

constructing a layer loss function of the each layer based on the difference between the each layer prediction result and the label respectively; and constructing the model loss function by weighted summing of the output layer loss function and the each layer loss function.

13. The training method of claim 11, wherein:

the main neural network structure comprises all layers except for the output layer of the neural network model comprising the three-level model, or, the main neural network structure comprises each layer that plays a primary prediction role except for the output layer of the neural network model comprising the three-level model.

14. A method of performing a prediction using a neural network model, the method comprising:

training the neural network model by the training method of claim 1;

acquiring a prediction data record;

generating features of a prediction sample based on attribute information of the prediction data record; and providing a corresponding prediction result for the prediction sample using the trained neural network model.

15. A non-transitory computer-readable storage medium storing instructions, wherein the instructions, when executed by at least one computing device, cause the at least one computing device to perform the method of claim 1.

16. The non-transitory computer-readable storage medium of claim 15, wherein the instructions, when executed by the at least one computing device, cause the at least one computing device to further perform the following operations:

acquiring a prediction data record;

generating features of a prediction sample based on attribute information of the prediction data record; and providing a corresponding prediction result for the prediction sample using the trained neural network model.

* * * * *